Nov. 16, 1943.  W. C. CLAY  2,334,175
DE-ICER FOR AIRCRAFT PROPELLERS
Filed Sept. 29, 1938  2 Sheets-Sheet 2
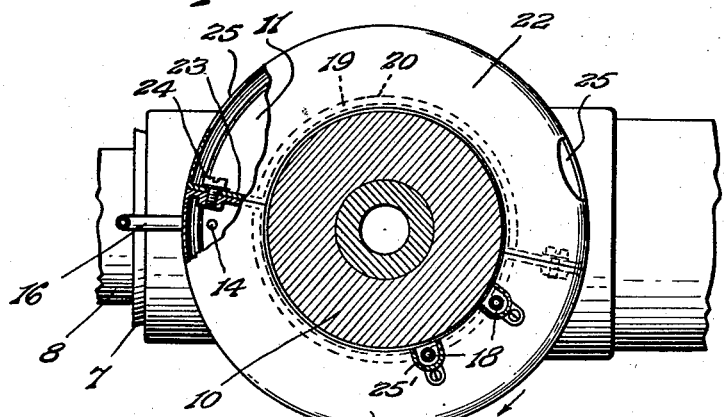
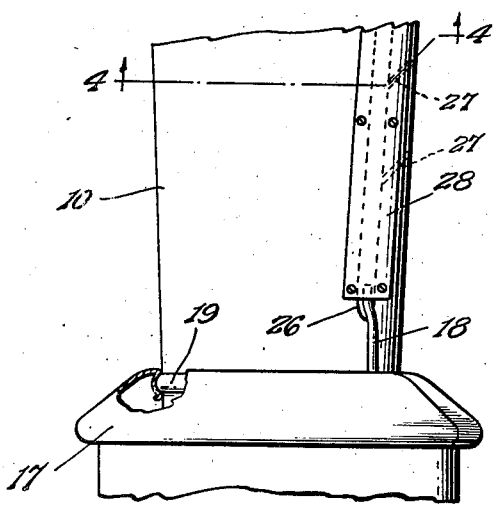
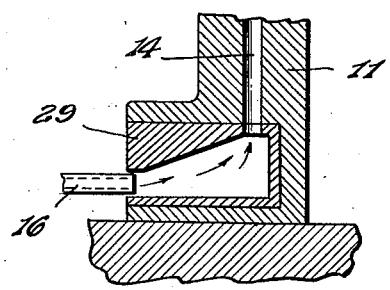
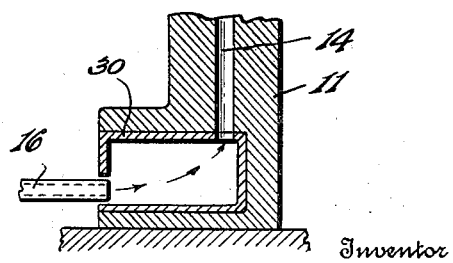
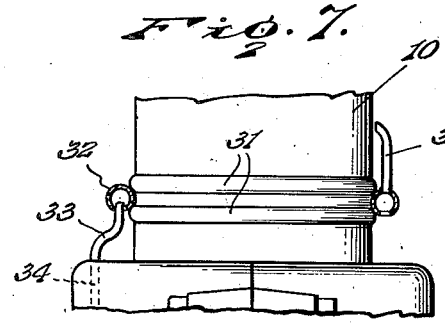
Inventor
William C. Clay.
By Lacey & Lacey, Attorneys Patented Nov. 16, 1943

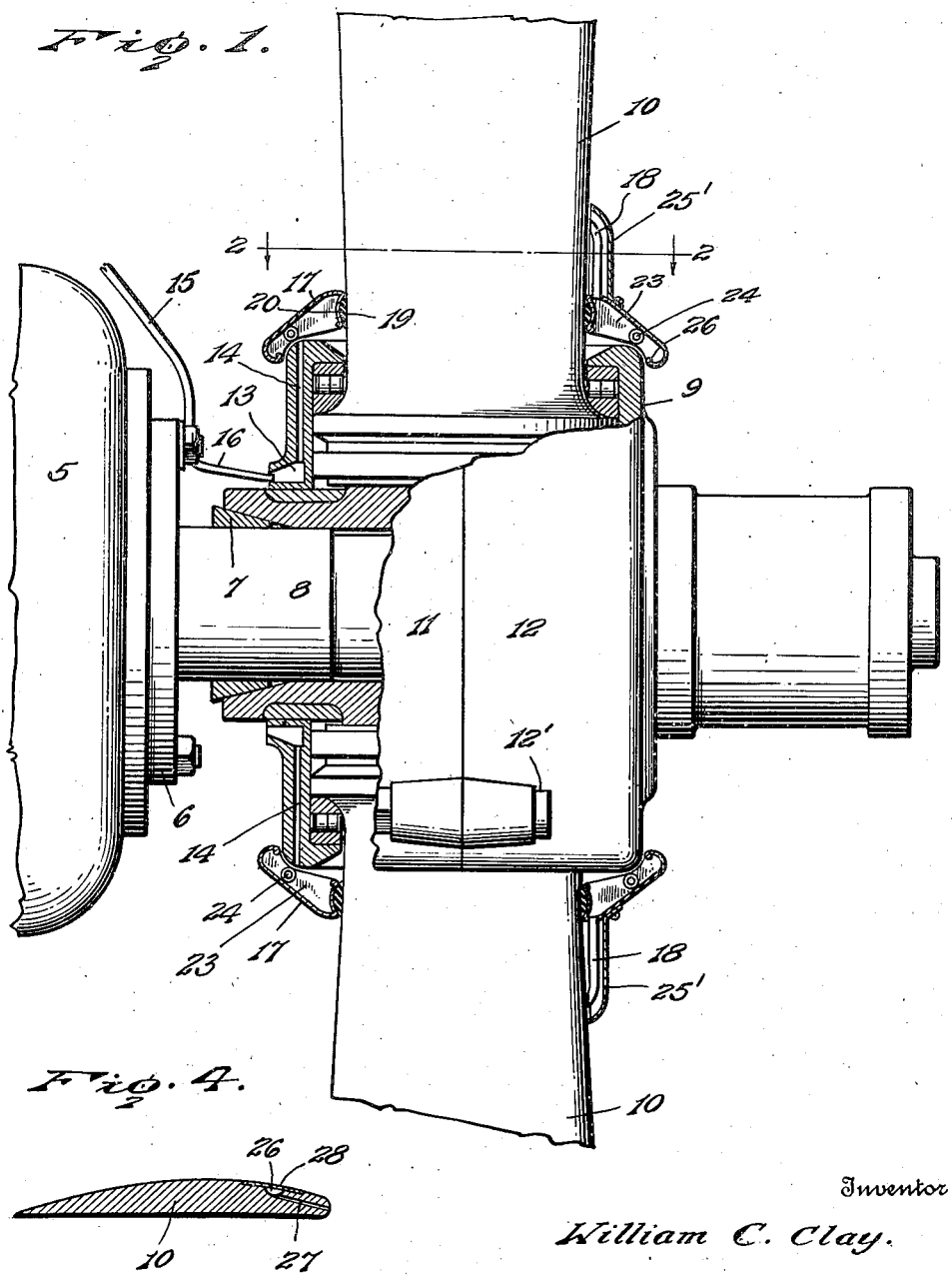

2,334,175

UNITED STATES PATENT OFFICE 2,334,175

DEICER FOR AIRCRAFT PROPELLERS

William C. Clay, Buckroe Beach, Va.

Application September 29, 1938, Serial No. 232,456

21 Claims. (Cl. 244—134)

This invention relates to de-icing devices for aircraft and more particularly to a de-icing device for the propellers thereof.

The object of the invention is to provide a de-icing unit of simple and compact construction which is built into the hub of an airplane propeller during the manufacture thereof and constitutes an integral or structural part of the hub, thus dispensing with separate de-icing gadgets together with their attaching supports while at the same time economizing in space, reducing load weight and rendering it unnecessary to employ the services of a mechanic to install the device when needed.

A further object of the invention is to provide a de-icing device which forms a permanent part of the propeller equipment and in which the de-icing fluid is automatically fed to the propeller blades without splashing or waste of the anti-freeze fluid and without interfering wtih the efficiency of the propeller.

A further object is to provide a propeller hub having an annular groove or trough formed therein and adapted to receive an anti-freeze fluid, said hub being provided with feed ducts extending radially from the groove and communicating with a distributing member so that, as the propeller rotates, the anti-freeze fluid will be thrown outwardly by centrifugal force and into the distributing member for delivery onto the propeller blades.

A further object is to provide a de-icer which can be used with equally good results on propellers either of the fixed blade or variable pitch blade type, means being provided for effecting a single or multiple point distribution of the anti-freeze fluid onto a propeller blade regardless of the blade position.

A further object is to provide a propeller having variable pitch blades and provided with a novel form of distributing member movable with the propeller blades and responsive to variations in the pitch thereof for automatically delivering anti-freeze mixture onto the effective air entering surface of the blades in all positions of pitch of said blades.

A still further object of the invention is generally to improve this class of devices so as to increase their utility, durability and efficiency.

In the accompanying drawings forming a part of this specification and in which similar numerals of reference indicate corresponding parts in all the figures of the drawings:

Figure 1 is a side elevation, partly in section, of a propeller of the variable pitch blade type provided with a de-icer constructed in accordance with the present invention, the mechanism for varying the pitch of the blades being omitted for sake of clearness, Figure 2 is a transverse sectional view taken on the line 2—2 of Figure 1, Figure 3 is a side elevation showing the manner of distributing the anti-freeze fluid along the leading edge of the propeller blade, Figure 4 is a transverse sectional view taken on the line 4—4 of Figure 3, Figure 5 is an enlarged detail sectional view illustrating a modified form of the invention, Figure 6 is a similar view illustrating another modification, and Figure 7 is a side elevation, partly in section, illustrating a furthe modification.

The improved de-icing device forming the subject-matter of the present invention may be installed on aircraft equipped with propellers having any number of blades, either of the fixed or variable pitch blade type, and by way of illustration is shown applied to a propeller having two variable pitch blades, in which 5 designates the engine crank case, 6 the thrust bearing cover plate, 7 the rear cone assembly for the propeller shaft 8, and 9 the hub forging carrying the blades 10 and formed of mating sections 11 and 12 detachably united by securing bolts 12'.

According to the present invention, I provide one of the hub sections, preferably the section 11, with an annular liquid receiving groove or trough 13 which may be formed in the hub forging either during the manufacture thereof or subsequently fabricated therein in any suitable manner, said groove or trough being tapered in cross section with its small end opening through the outer face of the hub adjacent the cone assembly, as shown. Communicating with the groove 13 are radiating feed ducts 14 which open through the opposite ends of the hub section 11 and through which an anti-freeze mixture is conducted from the trough for application to the blades 10. The anti-freeze mixture may be of any desired nature but it is preferred to use a solution of approximately eighty-five per cent alcohol and fifteen per cent glycerine as such a mixture has been found by actual tests to produce the best results. This anti-freeze mixture is fed through a conduit 15, one end of which communicates with a suitable supply tank housed within the body of the airplane or located in any other convenient position while the other end thereof is secured to one of the bolts of the thrust bearing cover plate and is thence extended inerally to form a discharge nozzle 16 which fits loosely within the open end of the trough or groove 13 so as to permit free rotation of the propeller without interfering with said nozzle.

Mounted on each propeller blade is a distributing member 17 preferably in the form of a hollow cap provided with one or more laterally extending discharge nozzles 18 through which the anti-freeze mixture is delivered onto the leading edge of the adjacent propeller blade in any position of pitch of said blade. Surrounding the root of each propeller blade is a ring 19 preferably formed of rubber and having its outer face convex, as shown, and adapted to receive a correspondingly concaved portion 20 on the distributing member or cap 17. The distributing member of cap 17 is preferably formed in two sections 21 and 22 having their inner ends provided with registering vertical partitions 23 through which extend bolts or similar fastening devices 24 for clamping the cap sections in liquid-tight engagement with the elastic ring 19 and thus cause the distributing member or cap to move with the propeller blade. Suitable openings 25 are formed in the section 22 of the cap to permit the insertion of a screw-driver or other tool for the purpose of adjusting the bolts 24 and thus clamp the cap in position on the adjacent propeller blade. The metal constituting the outer peripheral edge of each distributing member or cap is preferably curved inwardly and fits loosely over the adjacent end of the hub forging, said metal being provided with a rolled edge to form a circumferential strengthening bead 26. The anti-freeze mixture passes from the groove 13 through the feed ducts 14 and is thrown outwardly by centrifugal force against the inner surface of the cap and thence passes outwardly through the discharge nozzle or nozzles 18 onto the propeller blade. It will thus be seen that the distributing member 17 is movable with the propeller blades and is consequently responsive to variations in the pitch of the blades so that the de-icing mixture will be delivered onto the leading edge or effective air entering surface of the blades regardless of the angle or pitch of said blades. Any desired number of discharge tubes 18 may be provided so that either a single or multiple distribution of the liquid onto the propeller blade may be effected.

In operation, the anti-freeze mixture is fed through the conduit 15 into the groove or trough 13 and, as the propeller revolves, the liquid in said groove will be thrown outwardly by centrifugal force through the feed ducts 14 and against the inner surface of the adjacent distributing member 17 and thence be discharged through the nozzle or nozzles 18 onto the root of the adjacent propeller blade. As the distributing member 17 is secured to and is movable with the blade, the nozzle or nozzles 18 will always be in position to deliver the anti-freeze fluid onto the leading edge of a propeller blade, regardless of the position or pitch of the blade. The distributing member 17 not only insures proper placement of the anti-freeze liquid on the propeller blades regardless of the position of said blades but also obviates the necessity of providing complicated internal or external tubes for conveying the anti-freeze mixture from the groove 13 across the junction of the hub sections 11 and 12 for delivery to the propeller blade. Moreover, as the groove or trough 13 is formed directly in the hub forging and forms an integral part of the hub structure, the employment of separate de-icing devices or similar gadgets is entirely dispensed with, thereby reducing load weight and rendering it unnecessary to employ the services of a mechanic to install the device when needed. Furthermore, the construction of the device is such that the delivery of the de-icing fluid onto the blades is not effected by the turbulent circulation of air incident to rotation of the propeller and consequently the fluid is delivered onto the propeller blade without any splash or waste thereof and without interfering with the efficiency of the propeller. If desired, however, a guard or shield 25' may be secured to the distributing member adjacent each discharge nozzle 18 to assist in preventing air currents from interfering with the proper feeding of the fluid onto the propeller blades. In low speed propellers, some difficulty has heretofore been experienced in delivering the anti-freeze fluid on the outer ends of the propeller blades, and in order to insure uniform distribution of said fluid throughout the major portion of the length of the blade, I form a longitudinal groove 26 in one side of the blade near the leading edge thereof, as best shown in Figures 3 and 4 of the drawings. Communicating with the groove 26 at predetermined intervals along the length of the propeller blade are feed ducts 27 which extend to the leading edge of the blade and through which the fluid is delivered onto the blade. If desired, a cover plate 28 may be fitted over the groove 26 and secured to the propeller blade in any suitable manner, in which case the discharge end of the nozzle 18 will preferably fit within the base of said groove beneath the cover plate, as best shown in Figure 3 of the drawings.

The liquid receiving groove or trough 13 instead of being formed directly in the section 11 of the hub forging may be cut or molded into an insert or block 29 and the latter sweated or otherwise fitted within a correspondingly shaped groove in the hub forging, as best shown in Figure 5 of the drawings. In some cases the trough or groove 13 may be fashioned of sheet metal and sweated or shrunk into a seat formed in the adjacent hub section, as indicated at 30 in Figure 6 of the drawings.

In Figure 7, there is illustrated a further modification of the invention, in which the propeller blade is provided with upper and lower elastic rings 31 between which is fitted an annular distributing member preferably in the form of a ring 32, the lower portion of which is open and adapted to receive a short pipe section or tube 33 communicating with the adjacent feed duct 34, said ring being provided with one or more discharge nozzles 35 for delivering the anti-freeze fluid onto the propeller blade in any position or pitch of said blade.

It will thus be seen that there is provided a de-icing unit of simple and compact construction which may be built into the hub of an airplane propeller during the manufacture thereof and constitutes an integral or structural part of the hub, thus dispensing with separate de-icing gadgets together wtih their attaching supports while at the same time economizing in space, reducing load weight and eliminating the employment of complicated internal or external tubes or conduits for effecting delivery of the anti-freeze fluid onto a propeller blade. It will, furthermore, be noted that, owing to the fact that the distributing member is mounted on and movable with the propeller blade, the de-icer can be used with equally good results on propeller blades of either the fixed blade or the variable pitch blade type.

It is not essential to the operation of the de-icer that the distributing member be made in sections or entirely surround the root of the propeller blade as only that portion of the distributing member carrying the discharge nozzle or nozzles is utilized for effecting distribution of the anti-freeze liquid onto the propeller blade. It will, therefore, be understood that said distributing member may be of segmental or other desired formation and extend only partially around the root of the propeller blade and arranged at any desired angle or inclination with respect to the propeller hub without departing from the spirit of the invention.

While I have shown and described several practical embodiments of the invention capable of accomplishing the desired results, I do not desire to be limited to the construction shown, as I consider the salient feature of the invention to reside in an anti-freeze liquid receiver or trough having means associated therewith and responsive to variations in the pitch of the propeller blades for delivering anti-freeze liquid onto the effective entering surfaces of the blades regardless of the pitch or position of said blades.

From the foregoing description, it is thought the construction and operation of the device will be readily understood by those skilled in the art and further description thereof is deemed unnecessary.

Having thus described the invention, what is claimed as new is:

1. In an aircraft, the combination with a propeller including a hub and variable pitch blades, of means secured to and extending circumferentially of the blades in a substantially arcuate path adjacent the roots of the blades and movable with the blades in response to variations in the pitch of the blades, means operatively associated with said means for feeding de-icing fluid to the first mentioned means, and means operatively connected with said first mentioned means for delivering fluid onto said blades.

2. In an aircraft, the combination with a propeller including variable pitch blades, of a distributing member secured to and extending circumferentially of each blade in a substantially arcuate path adjacent the root of the blade for movement with the blade, a fluid receiver, means operatively associated with said member for conducting fluid from the receiver to the distributing member, and means communicating with said member for distributing fluid longitudinally of the leading edge of the blade in any blade position thereof.

3. In an aircraft, the combination with a propeller including variable pitch blades, of means secured to and extending circumferentially of the blades in a substantially arcuate path adjacent the root of each blade and movable with the blade in response to variations in the pitch of the blades, means operatively associated with said means for feeding de-icing fluid to the first mentioned means in any pitch adjustment of the blades, and means operatively connected with the first mentioned means for delivering said fluid onto said blades.

4. In an aircraft, the combination with a propeller having variable pitch blades, of a fluid receiver, means carried by and extending circumferentially of the blades in a substantially arcuate path adjacent the roots of the blades and movable as a unit with the blades in synchronization with the change of pitch of said blades, means operatively associated with said means for feeding de-icing fluid to the first mentioned means, and means operatively connected with said first mentioned means for delivering de-icing fluid onto the blades in any position of pitch of said blades.

5. An aircraft propeller including a hub and variable pitch blades, a fluid receiver, means carried by and extending circumferentially of the blades in a substantially arcuate path adjacent the roots of the blades and movable as a unit with the blades in response to variations in the pitch of the blades, means operatively associated with said means for conducting anti-freeze fluid by centrifugal force from the receiver to the first mentioned means, and means operatively connected with said first mentioned means for delivering fluid onto said blades.

6. An airplane propeller including a sectional hub and variable pitch blades, a distributing trough formed in one section of the hub, means for supplying anti-freeze liquid to the distributing trough, a hollow distributing member fitted on the hub and movable with the adjacent propeller blade, and a discharge nozzle carried by the distributing member for delivering the anti-freeze liquid onto the blade, said trough carrying section of the hub having a feed duct therein forming a source of communication between said trough and distributing member.

7. An airplane propeller including a hub and variable pitch blades, a trough in one wall of the hub and opening through one side of said wall, means for supplying anti-freeze liquid to the trough, a liquid distributing member carried by and movable with the adjacent propeller blade, a conduit communicating with the trough and distributing member respectively, and means for delivering anti-freeze liquid from the distributing member onto a propeller blade.

8. In an airplane, the combination with a propeller and rear cone assembly, of a de-icer comprising a trough disposed within one wall of the propeller hub and opening through said wall at the rear cone assembly, means for supplying anti-freeze liquid to the trough, a liquid distributing member disposed about and movable with the adjacent propeller blade, a conduit forming a source of communication between the trough and distributing member, and means for delivering the anti-freeze liquid from the distributing member onto a propeller blade.

9. In an airplane, the combination with a propeller including variable pitch blades and rear cone assembly, of a de-icer comprising a trough disposed within one wall of the propeller hub and opening through said wall adjacent the rear cone assembly, means for supplying anti-freeze liquid into the trough through the open side thereof, a liquid distributing member fitting around the adjacent propeller blade and movable therewith, a conduit forming a source of communication between the trough and the distributing member, a discharge nozzle communicating with the interior of the distributing member for delivering anti-freeze fluid onto the adjacent propeller blade, and a shield for the discharge end of the nozzle.

10. An airplane propeller including a hub and blades, a ring secured to each blade, a distributing member having liquid-tight contact with the ring, a liquid receiving trough, means for feeding anti-freeze liquid into the trough, a conduit forming a source of communication between the trough and distributing member, and a feed nozzle communicating with the interior of the distributing member for delivering anti-freeze mixture onto a propeller blade.

11. An airplane propeller including a hub and blades, a yieldable ring secured to the root of each propeller blade and having a convex outer surface, a sectional distributing member fitted about and movable with each blade and having a concave portion receiving the convex face of the ring, means for clamping the sections of the distributing member together in engagement with the ring, a liquid receiving trough, means for supplying anti-freeze mixture into said trough, there being feed ducts formed in the hub and communicating with the trough and distributing member respectively, and a nozzle carried by the distributing member for delivering the anti-freeze mixture onto the adjacent propeller blade.

12. An airplane propeller including a hub and variable pitch propeller blades, an annulus of resilient material secured to the root of each blade, a distributing member bearing against the annulus and formed of mating sections provided with registering partitions having openings formed therein, fastening devices extending through the openings in said partitions for clamping the distributing member in engagement with the annulus, a liquid receiving trough housed within the hub, means for feeding an anti-freeze mixture into said trough, there being feed ducts radiating from the trough and communicating with the interior of one of the sections of each distributing member, and means carried by said section for delivering the anti-freeze mixture onto a propeller blade.

13. An airplane propeller including a hub and variable pitch propeller blades, said hub being provided with an annular trough opening through one side of the hub, means for feeding anti-freeze liquid into the trough, spaced members secured to the root of the propeller blade, a distributing member fitting between the first-mentioned members and movable with the propeller blade, said distributing member having a slot formed therein, there being a feed duct formed in the propeller hub and extending from the trough to the outer surface of the hub, a conduit connected with the outer end of the feed duct and discharging into the slot of the distributing member, and a feed nozzle carried by said distributing member for delivering the anti-freeze mixture onto a propeller blade.

14. In an airplane propeller, a blade carrying hub having a trough built therein, means for supplying anti-freeze liquid to the trough, and a conduit communicating with the trough for delivering said fluid onto a propeller blade.

15. In an airplane propeller, a blade carrying hub, a trough in one wall of the hub and concealed thereby, means for supplying anti-freeze liquid to the trough, and a conduit in said wall in communication with the trough for delivering the anti-freeze onto a propeller blade.

16. In an airplane propeller, a blade carrying hub, a trough in one wall of the hub and forming a structural part of said hub, and means for supplying anti-freeze liquid to the trough, said wall having a feed conduit formed therein and communicating with the trough for delivering said fluid onto a propeller blade.

17. In an airplane propeller, a blade carrying hub, an annular trough in one wall of the hub and opening through said wall, means for supplying anti-freeze liquid into the trough through the open side thereof, and a conduit communicating with the trough and extending substantially radially therefrom for delivering said liquid onto a propeller blade.

18. An airplane propeller including a hub and variable pitch blades, a trough in one wall of the hub, means for supplying anti-freeze liquid to said trough, liquid distributing means carried by the blades and movable therewith relative to the hub about an axis at substantially right angles to the axis of rotation of the hub for delivering anti-freeze liquid onto said blades, and means for conducting anti-freeze liquid by centrifugal force from said trough through a wall of the hub to said liquid distributing means.

19. In an airplane, the combination with a propeller including a hub and feathering blades, of a de-icer comprising a liquid receiving trough disposed within the propeller hub, means for supplying anti-freeze liquid to the trough, a liquid distributing member operatively associated with blades and movable therewith relative to the hub about an axis at substantially right angles to the axis of rotation of the hub for delivering the anti-freeze mixture onto a propeller blade in any feathering position of said blade, and a conduit communicating with the trough discharging into said distributing member.

20. An airplane propeller including a hub and variable pitch blades, an annular trough arranged within the hub and entirely concealed thereby and disposed in a substantially vertical plane, means for feeding anti-freeze liquid into the trough, a liquid distributing member disposed in a substantially horizontal plane and mounted on and movable with the adjacent propeller blade relative to the hub in a path circumferentially of the longitudinal axis of the blade, a feed conduit extending from the trough and communicating with the distributing member, and means communicating with the interior of the distributing member for feeding anti-freeze liquid onto a propeller blade.

21. In a controllable pitch propeller, a catch annulus rotatable therewith, means for feeding de-icing fluid to the annulus, a member secured to a blade of the propeller and rotatable in pitch therewith having an arcuate groove part of which overlies the catch annulus in any blade pitch position, the annulus having an opening directed toward said groove to fling de-icing fluid thereto, and means to conduct the fluid from said groove to the leading edge of the propeller blade.

WILLIAM C. CLAY.